US012675623B2

(12) United States Patent
Zhang

(10) Patent No.: US 12,675,623 B2
(45) Date of Patent: Jul. 7, 2026

(54) TIMING OPTIMIZATION METHOD AND APPARATUS BASED ON OUTPUT TRANSITION CONSTRAINTS, AND COMPUTER DEVICE

(71) Applicant: Zhengxinyuan Technology (Hangzhou) Co., Ltd., Hangzhou (CN)

(72) Inventor: Lizheng Zhang, Hangzhou (CN)

(73) Assignee: Zhengxinyuan Technology (Hangzhou) Co., Ltd., Hangzhou (CN)

( * ) Notice: Subject to any disclaimer, the term of this patent is extended or adjusted under 35 U.S.C. 154(b) by 772 days.

(21) Appl. No.: 18/076,968

(22) Filed: Dec. 7, 2022

(65) Prior Publication Data

US 2024/0143879 A1 May 2, 2024

(30) Foreign Application Priority Data

Oct. 31, 2022 (CN) .......................... 202211345933.5

(51) Int. Cl.
*G06F 30/3315* (2020.01)
*G06F 30/323* (2020.01)
*G06F 119/12* (2020.01)

(52) U.S. Cl.
CPC ........ *G06F 30/3315* (2020.01); *G06F 30/323* (2020.01); *G06F 2119/12* (2020.01)

(58) Field of Classification Search
CPC . G06F 30/3315; G06F 30/323; G06F 2119/12
USPC ....................................................... 716/103
See application file for complete search history.

(56) References Cited

U.S. PATENT DOCUMENTS

| | | | | |
|---|---|---|---|---|
| 7,010,763 B2 * | 3/2006 | Hathaway | ............. | G06F 30/327 |
| | | | | 716/132 |
| 7,448,009 B2 * | 11/2008 | Pundoor | ................. | G06F 30/30 |
| | | | | 716/108 |
| 10,641,822 B2 * | 5/2020 | Balasubramanian | ........................ | |
| | | | | G01R 31/2882 |
| 2004/0230921 A1 * | 11/2004 | Hathaway | ............. | G06F 30/327 |
| | | | | 716/132 |
| 2007/0006106 A1 * | 1/2007 | Bartling | ................ | G06F 30/327 |
| | | | | 716/113 |
| 2007/0180415 A1 * | 8/2007 | Pundoor | ................. | G06F 30/30 |
| | | | | 716/108 |
| 2010/0257499 A1 * | 10/2010 | Alpert | ..................... | G06F 30/39 |
| | | | | 716/132 |

(Continued)

*Primary Examiner* — Suchin Parihar
(74) *Attorney, Agent, or Firm* — MUNCY, GEISSLER, OLDS & LOWE, P.C.

(57) ABSTRACT

A timing optimization method and apparatus based on output transition constraints, and a computer device. The method includes upon acquisition of all candidate target cells, performing timing optimization on each candidate target cell. The timing optimization includes: updating the candidate target cell to increase an area of the candidate target cell; performing timing analysis on a path where the updated candidate target cell is located, and acquiring updated timing parameters; determining whether output slew of the updated candidate target cell is less than a preset output slew threshold; if the output slew is less than the preset output slew threshold, ending optimization of the current candidate target cell, otherwise, determining whether a delay boost ratio of the updated candidate target cell is less than a delay boost ratio threshold.

18 Claims, 5 Drawing Sheets

(56) References Cited

U.S. PATENT DOCUMENTS

2018/0074116 A1*  3/2018  Balasubramanian  ........................
                                              G06F 30/367
2022/0121802 A1*  4/2022  Sherlekar  .............. G06F 30/392

* cited by examiner

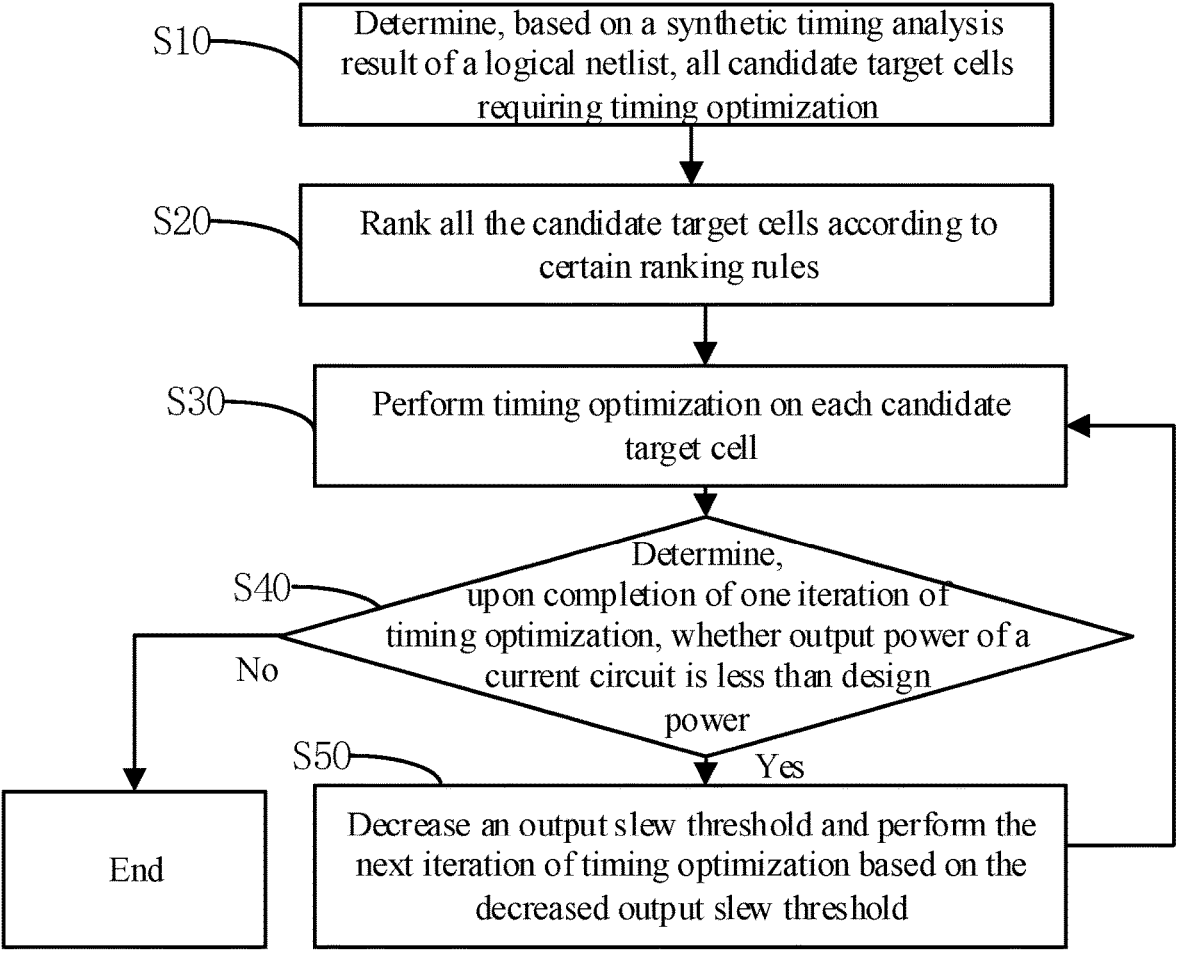

S10 — Determine, based on a synthetic timing analysis result of a logical netlist, all candidate target cells requiring timing optimization S20 — Rank all the candidate target cells according to certain ranking rules S30 — Perform timing optimization on each candidate target cell S40 — Determine, upon completion of one iteration of timing optimization, whether output power of a current circuit is less than design power No Yes End S50 — Decrease an output slew threshold and perform the next iteration of timing optimization based on the decreased output slew threshold

Figure 5

TIMING OPTIMIZATION METHOD AND APPARATUS BASED ON OUTPUT TRANSITION CONSTRAINTS, AND COMPUTER DEVICE

TECHNICAL FIELD

The present disclosure relates to the field of electronic design automation for integrated circuits, in particular to a timing optimization method and apparatus based on output transition constraints, and a computer device.

BACKGROUND OF THE INVENTION

In integrated circuit design, timing optimization during placement and routing is the key to achieving high-speed clock frequencies with the minimum power consumption for a given design. At present, primary timing optimization methods are to check each candidate target cell and try to acquire the maximum timing advantages from the candidate target cell. For a given logic circuit, the frequency improvements of a plurality of candidate target cells are additive, which means that the timing improvement of each target cell is equally important, and the sum of timing improvements of all candidate target cells may be what the integrated circuit timing optimization ultimately needs to achieve. FIG. 1 illustrates a flow diagram of an existing timing optimization algorithm. For each candidate target cell, the algorithm improves the delay of the candidate target cell by continuously increasing the area of a library cell of the candidate target cell until the delay of the candidate target cell is minimized.

However, in the integrated circuit design, timing, power and area are the basic contradictions. The timing advantage maximization pursued by the existing timing optimization algorithm may lead to over-optimization of the candidate target cells, which in turn directly leads to the increase of the area of the target cells and gate capacity. The increase of gate capacity may cause more power consumption, which is a great waste of resources. In addition, since the overall area of a chip is pre-designed, over-optimization of part of candidate target cells may most likely exhaust all the available chip area. As a result, other candidate target cells do not have the opportunity to obtain frequency boost by selecting a larger area. Because of those candidate target cells unable to obtain frequency boost, the frequency of the entire circuit may be lower than optimal operating frequency of the circuit.

SUMMARY OF THE INVENTION

In order to overcome at least one of the defects in the prior art, the present disclosure provides a timing optimization method and apparatus based on output transition constraints, and a computer device.

In order to achieve the above purpose, the present disclosure provides a timing optimization method based on output transition constraints. The method includes:

determining, based on a synthetic timing analysis result of a logical netlist, all candidate target cells requiring timing optimization; and performing timing optimization on each candidate target cell, including:

updating the candidate target cell to increase an area of the candidate target cell;

performing timing analysis on a path where the updated candidate target cell is located, and acquiring updated timing parameters, the timing parameters including output slew and delay of the candidate target cell;

determining whether the output slew of the updated candidate target cell is less than a preset output slew threshold; if the output slew of the updated candidate target cell is less than the preset output slew threshold, ending timing optimization of the current candidate target cell, otherwise, determining, based on delay output from previous timing analysis, whether a delay boost ratio of the updated candidate target cell is less than a delay boost ratio threshold; if the delay boost ratio of the updated candidate target cell is less than the delay boost ratio threshold, ending timing optimization of the current candidate target cell, otherwise, repeatedly performing the above steps to continue updating the area of the candidate target cell until the output slew of the candidate target cell is less than the output slew threshold or the delay boost ratio of the candidate target cell is less than the delay boost ratio threshold.

According to one embodiment of the present disclosure, in the same iteration of timing optimization, all the candidate target cells are constrained for timing optimization based on the same output slew threshold.

According to one embodiment of the present disclosure, upon completion of one iteration of timing optimization, whether output power of a circuit is less than design power is determined; if the output power of the circuit is less than the design power, the output slew threshold is decreased, and the next iteration of timing optimization is performed on all the candidate target cells based on the decreased output slew threshold.

According to one embodiment of the present disclosure, all the candidate target cells are ranked according to certain ranking rules before being optimized; and then timing optimization is performed on each candidate target cell sequentially against constraints of the output slew threshold and the delay boost ratio threshold.

According to one embodiment of the present disclosure, in the case that the given logical netlist has a plurality of clock sources, all the candidate target cells are classified based on types of the clock sources before being optimized; and during timing optimization of a plurality of candidate target cells of the same category, updating of areas of the candidate target cells takes into account clock skew of corresponding clock sources.

According to one embodiment of the present disclosure, during update of the candidate target cell, the area of the candidate target cell is increased by selecting a library cell; and upon update of the candidate target cell, the output slew and delay of the candidate target cell are determined by static timing analysis.

According to one embodiment of the present disclosure, upon acquisition of the synthetic timing analysis result of the logical netlist, a plurality of logic cells on a critical path are selected as the candidate target cells requiring timing optimization; alternatively, upon acquisition of the synthetic timing analysis result of the logical netlist, ranking is performed based on timing slack to select a plurality of target paths, and a plurality of logic cells on the plurality of target paths are selected as the candidate target cells requiring timing optimization.

In another aspect, the present disclosure further provides a timing optimization apparatus based on output transition constraints. The apparatus includes a target cell determining module and an optimization module. The target cell determining module determines, based on a synthetic timing analysis result of a logical netlist, all candidate target cells requiring timing optimization. The optimization module performs timing optimization on each candidate target cell, and includes an updating unit, a timing analysis unit, a slew determining unit, and a delay boost ratio determining unit. The updating unit updates the candidate target cell to increase an area of the candidate target cell. The timing analysis unit performs timing analysis on a path where the updated candidate target cell is located, and acquires updated timing parameters, the timing parameters including output slew and delay of the candidate target cell. The slew determining unit determines whether the output slew of the updated candidate target cell is less than a preset output slew threshold; if the output slew of the updated candidate target cell is less than the preset output slew threshold, timing optimization of the current candidate target cell ends, otherwise, the delay boost ratio determining unit determines, based on delay output from previous timing analysis, whether a delay boost ratio of the updated candidate target cell is less than a set delay boost ratio threshold; if the delay boost ratio of the updated candidate target cell is less than the set delay boost ratio threshold, timing optimization of the current candidate target cell ends, otherwise, the above steps are repeatedly performed to continue updating the area of the candidate target cell until the output slew of the candidate target cell is less than the output slew threshold or the delay boost ratio of the candidate target cell is less than the delay boost ratio threshold.

According to one embodiment of the present disclosure, in the same iteration of timing optimization, the optimization module constrain all the candidate target cells for timing optimization based on the same output slew threshold.

According to one embodiment of the present disclosure, the timing optimization apparatus based on output transition constraints further includes a power determining module and a slew adjusting module, upon completion of one iteration of timing optimization, the power determining module determining whether output power of a circuit is less than design power; if the output power of the circuit is less than the design power, the slew adjusting module decreasing the output slew threshold, and the next iteration of timing optimization being performed on all the candidate target cells based on the decreased output slew threshold.

In still another aspect, the present disclosure further provides a computer device, including a memory, a processor, and a computer program stored on the memory and capable of running on the processor. The processor, when executing the computer program, implements the steps of the above timing optimization method based on output transition constraints.

In yet another aspect, the present disclosure further provides a computer-readable storage medium having a computer program stored thereon. The computer program, when executed by a processor, implements the steps of the above timing optimization method based on output transition constraints.

In summary, by means of the timing optimization method and apparatus based on output transition constraints, and the computer device according to the present disclosure, during timing optimization of each candidate target cell, the output slew threshold and the delay boost ratio threshold are used as dual timing constraint conditions for the candidate target cell. Through the precedence constraint of the output slew threshold, rapid timing optimization of the candidate target cells can be rapidly achieved, and over-optimization is effectively avoided. Further constrained optimization is performed on candidate target cells that cannot meet the output slew threshold based on the delay boost ratio threshold, so that over-optimization of timing of the candidate target cells is avoided while the delay performance of the candidate target cells is improved to the greatest extent. Due to the dual timing constraints based on the output slew threshold and the delay boost ratio threshold, the timing optimization method according to the present disclosure can achieve equalized optimization of all the candidate target cells, so that the circuit can run at the optimal operating frequency, and the chip area and power can be at the optimal level of compromise.

In order to make the above and other objectives, features and advantages of the present disclosure more clearly understood, preferred embodiments are described below in detail in conjunction with the accompanying drawings.

BRIEF DESCRIPTION OF DRAWINGS

FIG. 5 illustrates a schematic flow diagram of a plurality of iterations of timing optimization.

DETAILED DESCRIPTION OF THE INVENTION

Figure 1:
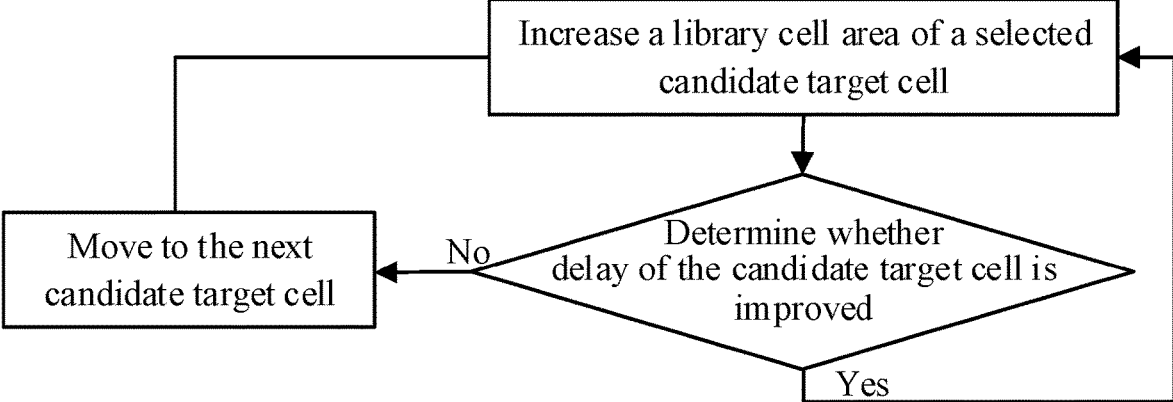
FIG. 1 illustrates a schematic flow diagram of an existing integrated circuit timing optimization algorithm.

FIG. 1 illustrates a schematic flow diagram of an existing integrated circuit timing optimization algorithm. During optimization of a candidate target cell, the frequency may be boosted if a library cell of the candidate target is changed from a smaller area to a larger area. The total chip area available for optimization is generally given as a fixed constraint. An optimization method pursuing timing maximization may cause candidate target cells (for example, a candidate target cell A) optimized first to exhaust all the available optimization area of a chip. As a result, candidate target cells (for example, a candidate target cell B) optimized later may not obtain frequency boost by selecting the library cell area. In other words, the candidate target cells A and B are not optimized equally. In this case, the overall operating frequency of a circuit may still not be well boosted due to limitation of timing of the candidate target cell B, despite the desirable timing performance of the candidate target cell A.

Figure 2:
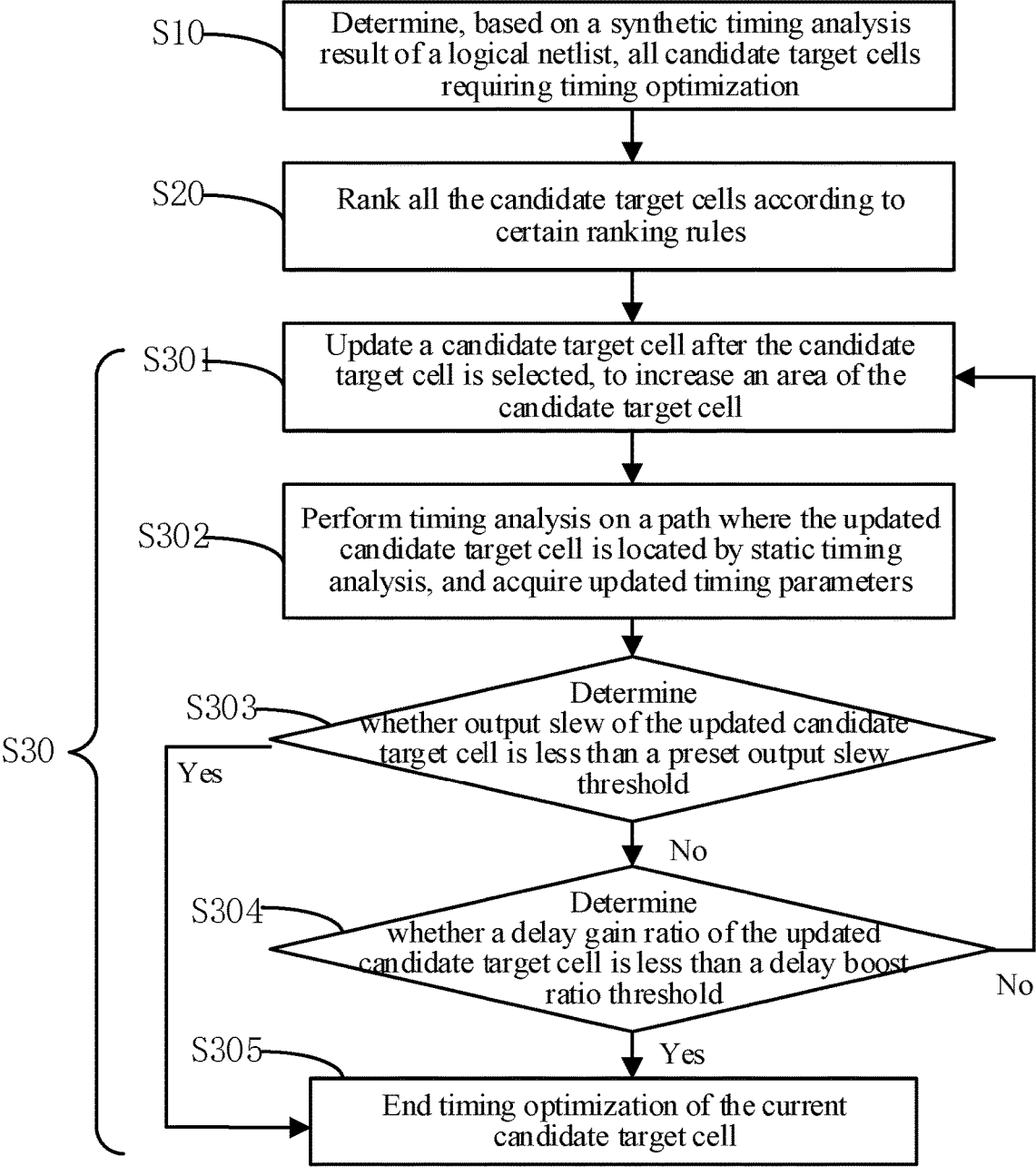
FIG. 2 illustrates a schematic flow diagram of a timing optimization method based on output transition constraints according to an embodiment of the present disclosure.
Figure 3:
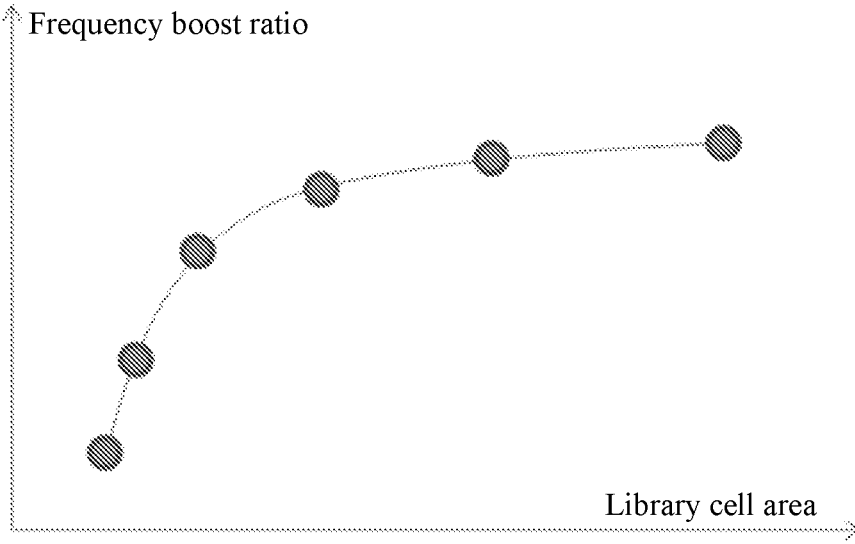
FIG. 3 illustrates a curve diagram of a library cell area and frequency boost gains.

In view of this, the present disclosure provides a timing optimization method that may achieve equalized optimization of all candidate cells to cause the circuit to run at the optimal frequency. As shown in FIG. 2, the timing optimization method based on output transition constraints according to this embodiment includes: step S10: determine, based on a synthetic timing analysis result of a logical netlist, all candidate target cells requiring timing optimization; and step S30: perform timing optimization on each candidate target cell. Specifically, step S30 includes: Update the candidate target cell to increase an area of the candidate target cell (step S301). Perform timing analysis on a path where the updated candidate target cell is located, and acquire updated timing parameters (step S302), the timing parameters including output slew and delay of the candidate target cell. Determine whether the output slew of the updated candidate target cell is less than a preset output slew threshold (step S303). If the output slew of the updated candidate target cell is less than the preset output slew threshold, end timing optimization of the current candidate target cell (step S305). If the output slew of the updated candidate target cell is greater than or equal to the preset output slew threshold, determine, based on delay output from previous timing analysis, whether a delay boost ratio of the updated candidate target cell is less than a delay boost ratio threshold (step S304). If the delay boost ratio of the updated candidate target cell is less than the delay boost ratio threshold, end timing optimization of the current candidate target cell (step S305). If the delay boost ratio of the updated candidate target cell is greater than or equal to the delay boost ratio threshold, repeatedly perform steps S301 to S305 until the output slew of the candidate target cell is less than the output slew threshold or the delay boost ratio of the candidate target cell is less than the delay boost ratio threshold.

Figure 4:
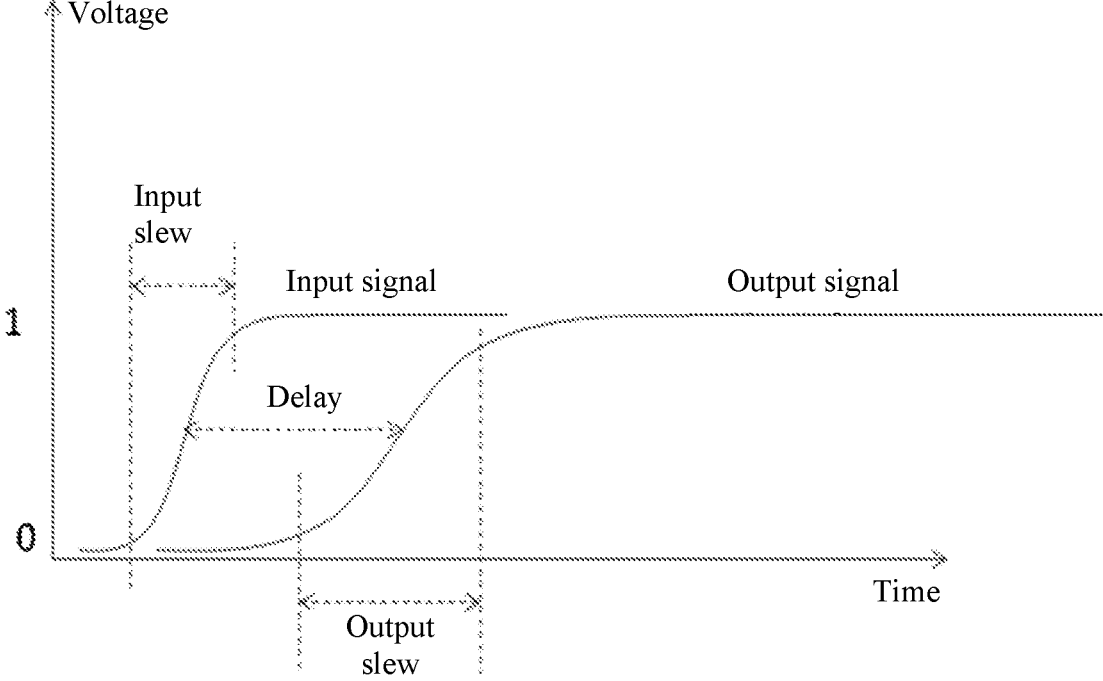
FIG. 4 illustrates a schematic diagram of a variation of a signal as the signal passes through a candidate target cell.
Figure 6:
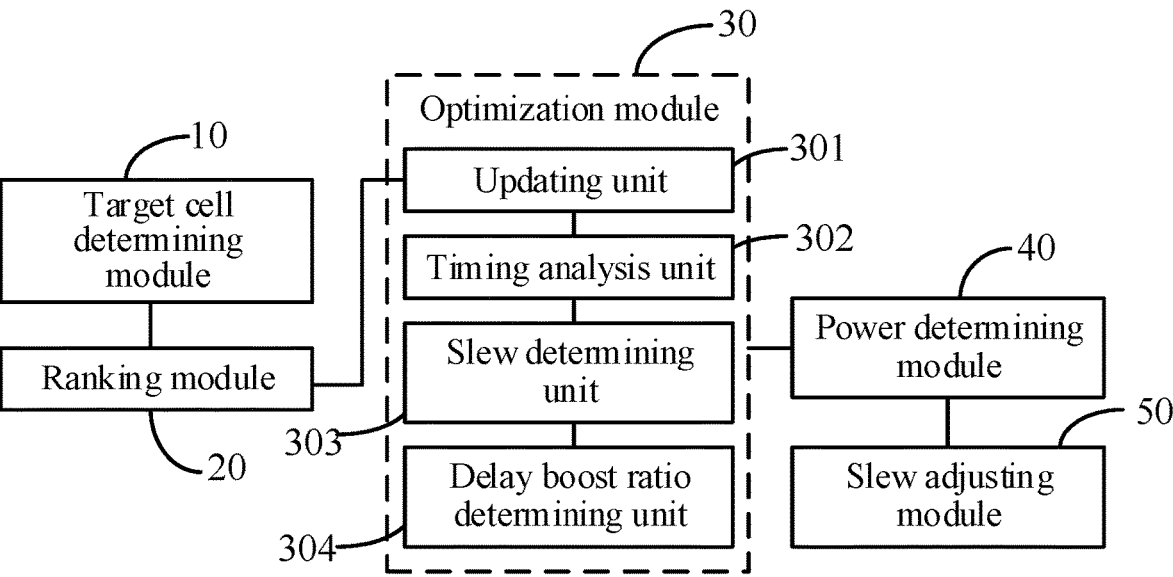
FIG. 6 illustrates a schematic structural diagram of a timing optimization apparatus based on output transition constraints according to an embodiment of the present disclosure.

As shown in FIG. 4, in a digital circuit, when a signal goes from 0 to 1 or from 1 to 0, a jump occurs, and the time required to complete jump transition is referred to as slew. In general, the time required to change the signal amplitude from 10% to 90% (or from 90% to 10%) is referred to as the output slew. When the signal passes through a logic cell, an output signal may be delayed for a period of time compared to an input signal, and this period of time is referred to as delay of the logic cell. The goal of timing optimization is to minimize the delay of the logic cell so that the circuit may run at the optimal frequency. In conjunction with FIG. 4, it may be seen that when the delay of the logic unit is small, corresponding output slew may also be small, that is, the output slew is rapid. Therefore, this embodiment proposes timing constraint conditions based on the output slew and the delay boost ratio to avoid over-optimization of the candidate target cells, thus realizing the overall equalized optimization of all the candidate cells. The timing optimization method based on output transition constraints according to this embodiment will be described in detail below in conjunction with FIG. 2 to FIG. 5.

As shown in FIG. 2, the timing optimization method based on output transition constraints according to this embodiment starts with step S10, where all the candidate target cells requiring timing optimization are determined based on the synthetic timing analysis result of the logical netlist. In this embodiment, synthetic timing analysis is performed after placement and routing are performed based on the logical netlist, and a plurality of logic cells on a critical path are selected as the candidate target cells requiring timing optimization based on the synthetic timing analysis result. The critical path refers to a timing path with the longest delay from an input to an output after the placement and routing. Specifically, the critical path with the longest delay may be found based on software such as a Quartus II timing analyzer. However, the present disclosure does not limit the determination of the candidate target cells in any way. In other embodiments, upon acquisition of the synthetic timing analysis result of the logical netlist, all paths may be ranked based on timing slack, a plurality of paths with negative timing slack or timing slack lower than a set threshold are determined as target paths, and a plurality of logic cells on the plurality of target paths are selected as the candidate target cells requiring timing optimization. Alternatively, in other embodiments, the timing optimization based on output transition constraints according to the present disclosure may also be used for adjusting the area of the logic cells based on timing analysis during the placement and routing, so that the timing during the placement and routing meets the constraint conditions. That is, the present disclosure does not limit the application steps of the timing optimization method based on output transition constraints in the integrated circuit design, and the method may be applied before or during the placement and routing, or after the placement and routing.

After the candidate target cells requiring optimization are selected in step S10, step S20 is performed: rank all the candidate target cells according to certain ranking rules. In this embodiment, since all the selected candidate target cells are from the critical path, all the candidate target cells are ranked in a direction of signal transmission on the critical path. However, the present disclosure does not limit this in any way. In the case that a plurality of candidate target cells are from a plurality of timing paths, all the candidate target cells may be ranked based on timing slack of each path. Alternatively, all the candidate target cells may be ranked sequentially according to the placement spatial location thereof. In other embodiments, in the case that the given logical netlist has a plurality of clock sources, all the candidate target cells may be classified based on types of the clock sources before being optimized. During timing optimization of a plurality of candidate target cells of the same category, updating of areas of the candidate target cells takes into account clock skew of corresponding clock sources, so as to minimize the skew of the same clock signal to each logic cell.

Step S30 is then executed: perform timing optimization on each candidate target cell sequentially in the ranking order. Step S301: Update the candidate target cell after the candidate target is selected, so as to increase the area of the candidate target cell. Specifically, the area of the candidate target cell is increased by selecting a standard library cell with a larger area. However, the present disclosure does not limit this in any way. The area of a candidate target cell with a non-standard library cell may also be increased by increasing the length or width of the candidate target cell.

Step S302: Perform timing analysis on the path where the updated candidate target cell is located by static timing analysis, and acquire the updated timing parameters. The timing parameters include the output slew and delay of the candidate target cell.

Step S303: Determine whether the output slew of the updated candidate target cell is less than the preset output slew threshold. If the output slew of the updated candidate target cell is less than the preset output slew threshold, it indicates that the candidate target cell meets the timing optimization conditions of this iteration, so step S305 is performed, that is, to end timing optimization of the current candidate target cell. If a result of step S303 indicates that the output slew of the current candidate target cell is still greater than or equal to the output slew threshold, step S304 is performed.

Step S304: Determine whether the delay boost ratio of the updated candidate target cell is less than the delay boost ratio threshold. The delay boost ratio refers to a ratio of the difference between the delay of the current timing analysis and the delay of the previous timing analysis to the delay of the previous timing analysis. In conjunction with the curve diagram of the library cell area and frequency boost gains shown in FIG. 3, in the case that the delay boost ratio is less than the set delay boost ratio threshold, it indicates that the delay boost from increasing the library cell area is very limited. In this case, it may cost more area if timing optimization of the candidate target cell continues. Therefore, when step S304 indicates that the delay boost ratio of the current timing analysis is less than the set delay boost ratio threshold, step S305 may be performed, that is, to end timing optimization of the candidate target cell, so as to avoid over-optimization.

If it is determined that the current delay boost ratio of the candidate target cell is still greater than or equal to the set delay boost ratio threshold in step S304, it indicates that the candidate target cell still has area for timing substitution, so step S301 is performed again, that is, to update the library cell area of the candidate target cell again. Steps S302 to S305 continue to be performed until the output slew of the candidate target cell is less than the preset output slew threshold or the delay boost ratio is less than the set delay boost ratio threshold.

All the candidate target cells are optimized sequentially according to the timing optimization steps described in steps S301 to S305, so as to complete one iteration of timing optimization. In this embodiment, in the same iteration of timing optimization, all the candidate target cells are constrained for timing optimization based on the same output slew threshold to achieve overall equalization of timing optimization. However, the present disclosure does not limit this in any way.

The output slew represents how fast the signal amplitude changes from 10% to 90% (or from 90% to 10%). The faster the output slew is, the smaller the delay of the candidate target cell may be. By means of the control based on the output slew threshold and the delay boost ratio threshold, the equalized optimization of all the candidate target cells may be achieved, however, the timing and power of the optimized circuit are highly dependent on the output slew threshold. The output slew threshold is predicted at the beginning of optimization based on the overall design performance of the circuit, and the prediction may take into account slack. To make the integrated circuit run at the optimal power while meeting the design power, further, the timing optimization method based on output transition constraints according to this embodiment further includes step S40: upon completion of one iteration of timing optimization, perform simulation and verification on the circuit to acquire output power of the current circuit, and determine whether the output power of the current circuit is less than the design power. If the output power of the current circuit is less than the design power, it indicates that the current circuit still has room for timing optimization, so step S50 is performed: decrease the output slew threshold, and perform the next iteration of timing optimization on all the candidate target cells based on the decreased output slew threshold, that is, perform steps S301 to S305 again. The output slew is gradually decreased to gradually increase the operating frequency of the circuit, that is, the optimal design of timing is achieved while the design power is met.

Corresponding to the above timing optimization method based on output transition constraints, the present disclosure further provides a timing optimization apparatus based on output transition constraints. The apparatus includes a target cell determining module 10, a ranking module 20, and an optimization module 30. The target cell determining module 10 determines, based on a synthetic timing analysis result of a logical netlist, all candidate target cells requiring timing optimization. The ranking module 20 ranks all the candidate target cells according to certain ranking rules. The optimization module 30 performs timing optimization on each candidate target cell, and includes an updating unit 301, a timing analysis unit 302, a slew determining unit 303, and a delay boost ratio determining unit 304. The updating unit 301 updates the candidate target cell to increase an area of the candidate target cell. The timing analysis unit 302 performs timing analysis on a path where the updated candidate target cell is located, and acquires updated timing parameters. The timing parameters include output slew and delay of the candidate target cell. The slew determining unit 303 determines whether the output slew of the updated candidate target cell is less than a preset output slew threshold. If the output slew of the updated candidate target cell is less than the preset output slew threshold, timing optimization of the current candidate target cell ends. If the output slew of the updated candidate target cell is greater than or equal to the preset output slew threshold, the delay boost ratio determining unit 304 determines, based on delay output from previous timing analysis, whether a delay boost ratio of the updated candidate target cell is less than a set delay boost ratio threshold. If the delay boost ratio of the updated candidate target cell is less than the set delay boost ratio threshold, timing optimization of the current candidate target cell ends. If the delay boost ratio of the updated candidate target cell is greater than or equal to the set delay boost ratio threshold, the updating unit 301, the timing analysis unit 302, the slew determining unit 303 and the delay boost ratio determining unit 304 may repeatedly perform steps S301 to S305 to continue updating the area of the candidate target cell until the output slew of the candidate target cell is less than the output slew threshold or the delay boost ratio of the candidate target cell is less than the delay boost ratio threshold.

Specifically, in the same iteration of timing optimization, the optimization module 30 may constrain all the candidate target cells for timing optimization based on the same output slew threshold. However, the present disclosure does not limit this in any way.

In order to make the equally optimized circuit have a better operating rate on the premise of ensuring that the design power meets the requirements, in this embodiment, the timing optimization apparatus based on output transition constraints further includes a power determining module 40 and a slew adjusting module 50. Upon completion of one iteration of timing optimization, the power determining module 40 determines whether the output power of the circuit is less than the design power based on a simulation result. If the output power of the circuit is less than the design power, the slew adjusting module 50 may decrease the output slew threshold, and the next iteration of timing optimization is performed on all the candidate target cells based on the decreased output slew threshold, that is, steps S301 to S305 are performed again.

The functions and implementation process of each module in the above apparatus are detailed in the implementation process of the corresponding steps of the above method, which will thus not be repeated here.

In another aspect, the present disclosure further provides a computer device, including a memory, a processor, and a computer program stored on the memory and capable of running on the processor. The processor, when executing the computer program, implements the above steps of timing optimization based on output transition constraints according to the present disclosure.

In still another aspect, the present disclosure further provides a computer-readable storage medium, having a computer program stored thereon. The computer program, when executed by a processor, implements the above steps of timing optimization based on output transition constraints according to the present disclosure.

In summary, by means of the timing optimization method and apparatus based on output transition constraints, and the computer device according to the present disclosure, during timing optimization of each candidate target cell, the output slew threshold and the delay boost ratio threshold are used as dual timing constraint conditions for the candidate target cell. Through the precedence constraint of the output slew threshold, rapid optimization of the candidate target cells can be rapidly achieved, and over-optimization is effectively avoided. Further constrained optimization is performed on candidate target cells that cannot meet the output slew threshold based on the delay boost ratio threshold, so that over-optimization of timing of the candidate target cells is avoided while the delay performance of the candidate target cells is improved to the greatest extent. Due to the dual timing constraints based on the output slew threshold and the delay boost ratio threshold, the timing optimization method according to the present disclosure can achieve equalized optimization of all the candidate target cells, so that the circuit can run at the optimal operating frequency, and the chip area and power can be at the optimal level of compromise.

Although the present disclosure has been described with reference to the above preferred embodiments, the present disclosure is not to be restricted by the preferred embodiments. It will be understood by those skilled in the art that various changes and modifications may be made without departing from the spirit and scope of the present disclosure as defined by the appended claims.

The invention claimed is:

1. A timing optimization method based on output transition constraints, comprising:

determining, based on a synthetic timing analysis result of a logical netlist, all candidate target cells requiring timing optimization; and performing timing optimization on each candidate target cell, comprising:

updating the candidate target cell to increase an area of the candidate target cell;

performing timing analysis on a path where the updated candidate target cell is located, and acquiring updated timing parameters, the timing parameters comprising output slew and delay of the candidate target cell;

determining whether the output slew of the updated candidate target cell is less than a preset output slew threshold; if the output slew of the updated candidate target cell is less than the preset output slew threshold, ending timing optimization of the current candidate target cell, otherwise, determining, based on delay output from previous timing analysis, whether a delay boost ratio of the updated candidate target cell is less than a preset delay boost ratio threshold; if the delay boost ratio of the updated candidate target cell is less than the preset delay boost ratio threshold, ending timing optimization of the current candidate target cell, otherwise, repeatedly performing the above steps to continue updating the area of the candidate target cell until the output slew of the candidate target cell is less than the output slew threshold or the delay boost ratio of the candidate target cell is less than the delay boost ratio threshold;

wherein in the same iteration of timing optimization, all the candidate target cells are constrained for timing optimization based on the same output slew threshold;

wherein upon completion of one iteration of timing optimization, whether output power of a circuit is less than design power is determined; if the output power of the circuit is less than the design power, the output slew threshold is decreased, and the next iteration of timing optimization is performed on all the candidate target cells based on the decreased output slew threshold.

2. The timing optimization method based on output transition constraints according to claim 1, wherein all the candidate target cells are ranked according to certain ranking rules before being optimized; and then timing optimization is performed on each candidate target cell sequentially against constraints of the output slew threshold and the delay boost ratio threshold.

3. The timing optimization method based on output transition constraints according to claim 2, wherein in the case that all the candidate target cells are from the same timing path, all the candidate target cells are ranked in a direction of signal transmission on the path; alternatively, in the case that a plurality of candidate target cells are from a plurality of timing paths, all the candidate target cells are ranked preferably based on timing slack of each path.

4. The timing optimization method based on output transition constraints according to claim 1, wherein in the case that the given logical netlist has a plurality of clock sources, all the candidate target cells are classified based on types of the clock sources before being optimized; and during timing optimization of a plurality of candidate target cells of the same category, updating of areas of the candidate target cells takes into account clock skew of corresponding clock sources.

5. The timing optimization method based on output transition constraints according to claim 1, wherein during update of the candidate target cell, the area of the candidate target cell is increased by selecting a library cell; alternatively, in the case that the candidate target cell is a non-standard library cell, the area of the candidate target cell is increased by increasing a length or width of the candidate target cell at a preset scale; and upon update of the candidate target cell, the output slew and delay of the candidate target cell are determined by static timing analysis.

6. The timing optimization method based on output transition constraints according to claim 1, wherein upon acquisition of the synthetic timing analysis result of the logical netlist, a plurality of logic cells on a critical path are selected as the candidate target cells requiring timing optimization, the critical path referring to a timing path with the longest delay from an input to an output after placement and routing.

7. The timing optimization method based on output transition constraints according to claim 1, wherein upon acquisition of the synthetic timing analysis result of the logical netlist, ranking is performed based on timing slack to select a plurality of target paths, and a plurality of logic cells on the plurality of target paths are selected as the candidate target cells requiring timing optimization.

8. The timing optimization method based on output transition constraints according to claim 1, being applicable to timing and area optimization of a circuit based on design power during or after placement and routing.

9. A timing optimization apparatus based on output transition constraints, comprising:

a target cell determining module, determining, based on a synthetic timing analysis result of a logical netlist, all candidate target cells requiring timing optimization; and an optimization module, performing timing optimization on each candidate target cell, and comprising an updating unit, a timing analysis unit, a slew determining unit, and a delay boost ratio determining unit, wherein the updating unit updates the candidate target cell to increase an area of the candidate target cell;

the timing analysis unit performs timing analysis on a path where the updated candidate target cell is located, and acquires updated timing parameters, the timing parameters comprising output slew and delay of the candidate target cell;

the slew determining unit determines whether the output slew of the updated candidate target cell is less than a preset output slew threshold; if the output slew of the updated candidate target cell is less than the preset output slew threshold, timing optimization of the current candidate target cell ends, otherwise, the delay boost ratio determining unit determines, based on delay output from previous timing analysis, whether a delay boost ratio of the updated candidate target cell is less than a set delay boost ratio threshold; if the delay boost ratio of the updated candidate target cell is less than the set delay boost ratio threshold, timing optimization of the current candidate target cell ends, otherwise, the above steps are repeatedly performed to continue updating the area of the candidate target cell until the output slew of the candidate target cell is less than the output slew threshold or the delay boost ratio of the candidate target cell is less than the delay boost ratio threshold;

wherein the timing optimization apparatus based on output transition constraints further comprises a power determining module and a slew adjusting module, upon completion of one iteration of timing optimization, the power determining module determining whether output power of a circuit is less than design power; if the output power of the circuit is less than the design power, the slew adjusting module decreasing the output slew threshold, and the next iteration of timing optimization being performed on all the candidate target cells based on the decreased output slew threshold.

10. The timing optimization apparatus based on output transition constraints according to claim 9, wherein in the same iteration of timing optimization, the optimization module constrains all the candidate target cells for timing optimization based on the same output slew threshold.

11. The timing optimization apparatus based on output transition constraints according to claim 9, further comprising a ranking module, the ranking module ranking all the candidate target cells according to certain ranking rules before all the candidate target cells are optimized; then the optimization module performing timing optimization on each candidate target cell sequentially against constraints of the output slew threshold and the delay boost ratio threshold.

12. The timing optimization apparatus based on output transition constraints according to claim 11, wherein in the case that all the candidate target cells are from the same timing path, the ranking module ranks all the candidate target cells in a direction of signal transmission on the path; alternatively, in the case that a plurality of candidate target cells are from a plurality of timing paths, the ranking module ranks all the candidate target cells preferably based on timing slack of each path.

13. The timing optimization apparatus based on output transition constraints according to claim 9, wherein in the case that the given logical netlist has a plurality of clock sources, the target cell determining module classifies all the candidate target cells based on types of the clock sources before all the candidate target cells are optimized; and during timing optimization of a plurality of candidate target cells of the same category, updating of areas of the candidate target cells takes into account clock skew of corresponding clock sources.

14. The timing optimization apparatus based on output transition constraints according to claim 9, wherein during update of the candidate target cell, the updating unit increases the area of the candidate target cell by selecting a library cell; alternatively, in the case that the candidate target cell is a non-standard library cell, the updating unit increases the area of the candidate target cell by increasing a length or width of the candidate target cell at a preset scale; and upon update of the candidate target cell, the timing analysis unit determines the output slew and delay of the candidate target cell by static timing analysis.

15. The timing optimization apparatus based on output transition constraints according to claim 9, wherein upon acquisition of the synthetic timing analysis result of the logical netlist, the target cell determining module selects a plurality of logic cells on a critical path as the candidate target cells requiring timing optimization, the critical path referring to a timing path with the longest delay from an input to an output after placement and routing; alternatively, upon acquisition of the synthetic timing analysis result of the logical netlist, the target cell determining module performs ranking based on timing slack to select a plurality of target paths, and selects a plurality of logic cells on the plurality of target paths as the candidate target cells requiring timing optimization.

16. A computer device comprising a memory, a processor, and a computer program stored on the memory and capable of running on the processor, wherein the processor, when executing the computer program, implements the steps of the timing optimization method based on output transition constraints according to claim 1.

17. A computer-readable storage medium having a computer program stored thereon, wherein the computer program, when executed by a processor, implements the steps of the timing optimization method based on output transition constraints according to claim 1.

18. A timing optimization apparatus based on output transition constraints, comprising:

a target cell determining module, determining, based on a synthetic timing analysis result of a logical netlist, all candidate target cells requiring timing optimization; and an optimization module, performing timing optimization on each candidate target cell, and comprising an updating unit, a timing analysis unit, a slew determining unit, and a delay boost ratio determining unit, wherein the updating unit updates the candidate target cell to increase an area of the candidate target cell;

the timing analysis unit performs timing analysis on a path where the updated candidate target cell is located, and acquires updated timing parameters, the timing parameters comprising output slew and delay of the candidate target cell;

the slew determining unit determines whether the output slew of the updated candidate target cell is less than a preset output slew threshold; if the output slew of the updated candidate target cell is less than the preset output slew threshold, timing optimization of the current candidate target cell ends, otherwise, the delay boost ratio determining unit determines, based on delay output from previous timing analysis, whether a delay boost ratio of the updated candidate target cell is less than a set delay boost ratio threshold; if the delay boost ratio of the updated candidate target cell is less than the set delay boost ratio threshold, timing optimization of the current candidate target cell ends, otherwise, the above steps are repeatedly performed to continue updating the area of the candidate target cell until the output slew of the candidate target cell is less than the output slew threshold or the delay boost ratio of the candidate target cell is less than the delay boost ratio threshold;

wherein in the case that the given logical netlist has a plurality of clock sources, the target cell determining module classifies all the candidate target cells based on types of the clock sources before all the candidate target cells are optimized; and during timing optimization of a plurality of candidate target cells of the same category, updating of areas of the candidate target cells takes into account clock skew of corresponding clock sources.

\* \* \* \* \*